United States Patent
Zhang et al.

(10) Patent No.: US 11,709,001 B2
(45) Date of Patent: Jul. 25, 2023

(54) FLOW SENSOR FOR VEHICLE LIQUID HEATER WHICH PROTECTS AGAINST OVERHEATING

(71) Applicant: BorgWarner Emissions Systems (Ningbo) Co., Ltd., Ningbo (CN)

(72) Inventors: Fei Zhang, Ningbo (CN); Xiaoyong Ding, Ningbo (CN); Yanyan Guo, Ningbo (CN)

(73) Assignee: BorgWarner Emissions Systems (NINGBO) Co., Ltd., Ningbo (CN)

( * ) Notice: Subject to any disclaimer, the term of this patent is extended or adjusted under 35 U.S.C. 154(b) by 231 days.

(21) Appl. No.: 17/012,950

(22) Filed: Sep. 4, 2020

(65) Prior Publication Data

US 2021/0071912 A1    Mar. 11, 2021

(30) Foreign Application Priority Data

Sep. 6, 2019   (CN) .......................... 201921476037.6

(51) Int. Cl.
| | |
|---|---|
| *F24H 9/20* | (2022.01) |
| *F24H 1/10* | (2022.01) |
| *H01H 35/40* | (2006.01) |
| *G01F 1/28* | (2006.01) |
| *H01M 10/625* | (2014.01) |

(52) U.S. Cl.
CPC ........... *F24H 9/2028* (2013.01); *F24H 1/102* (2013.01); *G01F 1/28* (2013.01); *H01H 35/40* (2013.01); *H01M 10/625* (2015.04)

(58) Field of Classification Search
CPC ..... G01F 1/06; G01F 1/28; G01P 5/04; G01P 5/07; G01P 5/06; G01P 5/065; H01H 35/40; H01H 35/405; F24H 1/102; F24H 1/103; F24H 1/105; F24H 9/2028; H01M 10/625
See application file for complete search history.

(56) References Cited

U.S. PATENT DOCUMENTS

| | | | | |
|---|---|---|---|---|
| 2,600,309 | A | *   6/1952 | Macdonald ............... | G01F 1/28 310/104 |
| 4,497,434 | A | *   2/1985 | Lawless ................ | F24H 9/2035 236/23 |

(Continued)

FOREIGN PATENT DOCUMENTS

| | | | |
|---|---|---|---|
| CN | 102403167 A | * | 4/2012 |
| JP | 07280343 A | * | 10/1995 |

(Continued)

OTHER PUBLICATIONS https://www.thomasnet.com/insights/how-to-decide-between-a-reed-switch-or-a-hall-switch/ (Year: 2018).*

*Primary Examiner* — Edelmira Bosques
*Assistant Examiner* — Brett Peterson Mallon
(74) *Attorney, Agent, or Firm* — Bose McKinney & Evans LLP

(57) ABSTRACT

A flow heater for new forms of vehicles. The flow heater comprises a passageway for liquid, a heating source, a swing mechanism arranged in the passageway, and a sensor for detecting a position of the swing mechanism. In some embodiments, the swing mechanism includes a flap and a stopper wherein the flap is hinged to an inner wall and the stopper is fixed to an inner wall and located to abut the flap in the absence of flow.

12 Claims, 2 Drawing Sheets

(56) References Cited

U.S. PATENT DOCUMENTS

| | | | | |
|---|---|---|---|---|
| 4,567,350 A * | 1/1986 | Todd Jr. | .................. | F24H 1/102 |
| | | | | 392/489 |
| 4,738,395 A * | 4/1988 | Chilton | ............... | F24D 19/1006 |
| | | | | 236/23 |
| 4,848,655 A * | 7/1989 | Woodin | ................ | G01P 13/002 |
| | | | | 237/19 |
| 5,767,419 A * | 6/1998 | Hutchinson | ............... | G01F 1/24 |
| | | | | 73/861.74 |
| 5,847,288 A * | 12/1998 | Hutchinson | ......... | G01P 13/0086 |
| | | | | 73/861.75 |
| 5,945,608 A * | 8/1999 | Hutchinson | ............... | G01P 5/04 |
| | | | | 73/861.71 |
| 7,299,819 B1 * | 11/2007 | Fenton | .................... | G01P 13/04 |
| | | | | 137/460 |
| 2007/0295104 A1 * | 12/2007 | Ellegood | ................... | G01F 1/28 |
| | | | | 73/861.79 |
| 2013/0093543 A1 * | 4/2013 | Garcia Navajas | ... | H01H 36/008 |
| | | | | 29/622 |
| 2014/0345516 A1 * | 11/2014 | DeVerse | ................ | G01P 5/065 |
| | | | | 116/275 |

FOREIGN PATENT DOCUMENTS

| | | | | | |
|---|---|---|---|---|---|
| JP | H09105653 | A | * | 10/1995 | |
| JP | H11111131 | A | * | 10/1997 | |
| JP | H10109049 | A | * | 4/1998 | |
| JP | 2592273 | Y2 | * | 3/1999 | |
| JP | 2006138576 | A | * | 6/2006 | |
| JP | 2015169558 | A | * | 9/2015 | |
| JP | 2015170503 | A | * | 9/2015 | |
| JP | 2018097929 | A | * | 6/2018 | |
| WO | WO-9316336 | A1 | * | 8/1993 | ........... F24H 9/2028 |

\* cited by examiner

FLOW SENSOR FOR VEHICLE LIQUID HEATER WHICH PROTECTS AGAINST OVERHEATING

RELATED APPLICATIONS

This application claims priority to Chinese utility model 201921476037.6, filed Sep. 6, 2019, which was published as CN 210296571 U, the entire disclosure of which is hereby incorporated herein by reference.

BACKGROUND

This disclosure relates to a flow heater for automobiles, especially for heating a battery of an electric vehicle.

Prior art flow heaters generally comprise a resistor material and an insulating layer printed or coated onto an outer surface of a cooling liquid flow channel, e.g., by screen printing. Heating power is adjusted by means of an electric circuit and a program to control the water outlet temperature. A flow heater can be rapidly heated to the optimal working temperature. Although most applications can be met in this way, unpredictable working conditions such as instantaneous change of coolant flow, untimely response of a control system and the like exist. The heater may fail due to dry burning, burning of a heating resistor, damage of an insulating layer and the like when the flow of the coolant is low. A damaged heater may even cause a fire.

SUMMARY

This disclosure teaches a flow heater for a vehicle, especially an electric vehicle, with improved protection from overheating.

An embodiment of a flow heater according to this disclosure may comprise a swing mechanism configured to be moved by liquid entering the flow heater through an entrance. The swing mechanism detects liquid flow and a control system can thereby monitor the coolant liquid flow more accurately. If there is no liquid flow, the swing mechanism is in a resting position. If there is liquid flow, liquid pushed against the swing mechanism and causes it to move or pivot away from its resting position. By monitoring the position of the swing mechanism, it is possible to detect a lack of flow and to thereby trigger a failure protection procedure, e.g., to switch off heating power.

An embodiment of this disclosure may use the technical concept of a coolant liquid passageway, a heating source and a swing mechanism. The passageway is formed by a casing, the heating source is located on the outside of intermediate section of the passageway. The ends of the passageway are coolant liquid inlet and outlet, respectively. The swing mechanism may be located at the entrance or inside the passageway. The swing mechanism may comprise a flap or valve block and stopper. The valve block or flap may be hinged at a wall of the passageway, e.g., at an inner wall top. The stopper may be fixed at an inner wall and flap or valve block located below in order to prevent the valve block from turning to the entry outside. The valve block or flap may comprise a magnet, e.g., magnetic steel. Outside of the passageway a hall sensor may be arranged to detect the position of the flap or valve block. A bypass liquid way might be provided between the swing mechanism and the inner wall, especially the entry inner wall.

In a refinement of this disclosure, the inlet and the outlet are both facing the same side.

In a further refinement of this disclosure, the bypass liquid path is located between a limiting block or flap and the inner wall of the inlet.

In a further refinement of this disclosure, the valve plate is made of stainless steel or aluminum. Thereby it is more wear-resistant and corrosion-resistant.

In a further refinement of this disclosure, the valve plate is in the shape of a circular or oval plate and is fixed above the inner wall of the inlet through a rotating shaft, and the rotating shaft is parallel to the long diameter, i.e., long axis, of the oval.

In a further refinement of this disclosure, the joint with the rotating shaft is the root of the flap or valve plate, the thickness of the flap or valve plate is gradually reduced from the root to the top, and the front surface and the rear surface of the valve plate are streamline surfaces.

In a further refinement of this disclosure, a magnet, e.g., magnetic steel, is fixed on the flap or valve plate.

In a further refinement of this disclosure, an upper surface and a lower surface of the flap or limiting block are both arc-shaped.

This disclosure relates to a flow heater for a vehicle, and may comprise the following features: The swing mechanism may be integrated at a cooling liquid inlet of the heater. The swing mechanism provides flow detection and may also provide a bypass liquid path and a one-way valve. The swing mechanism may provide flow data to the control system. A hall sensor allows to detect the position of the swing mechanism without breaching any wall of the liquid passageway. Thus, the structure of the battery pack heater does not need to be damaged or changed, and no additional sealing element needs to be added. Risks of leakage and the like are thereby minimized. The bypass liquid path ensures that cooling liquid in the heater is full, and the bypass liquid path is used as a lowest flow channel, so that the consumption of the cooling liquid and related energy sources is saved. Real-time flow data provided by the swing mechanism and a control system can provide real-time and accurate data feedback in order to prevent dry burning, derating and the like, so that the control system can make an accurate command, and the low-flow dry burning condition is avoided.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
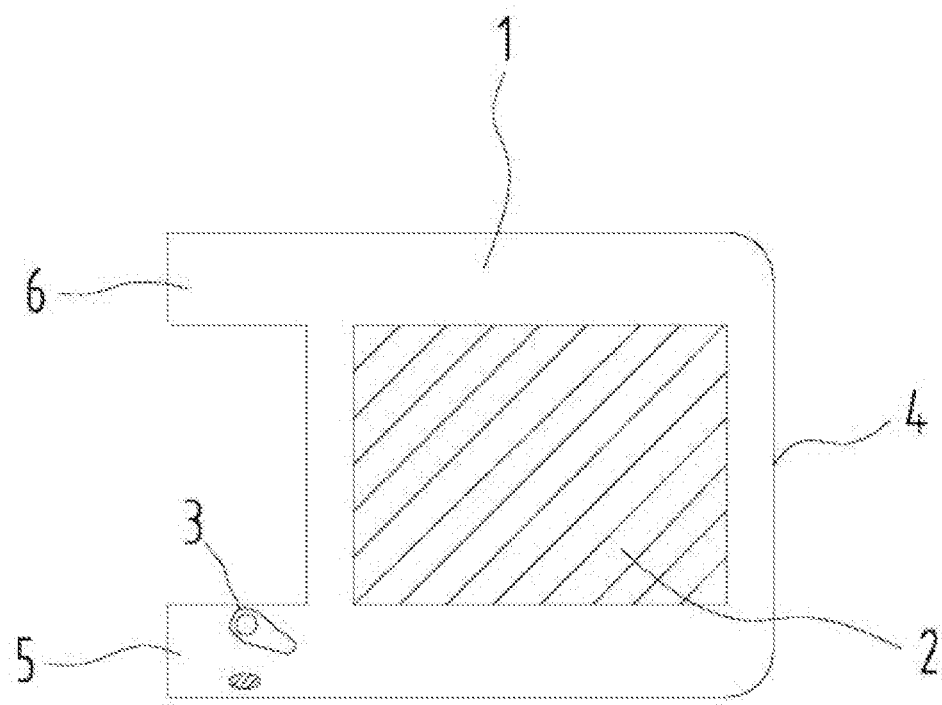
FIG. 1 is a schematic view of the overall structure of an embodiment of a heater.

The embodiments described below are not intended to be exhaustive or to limit the invention to the precise forms disclosed in the following description. Rather, the embodiments are chosen and described so that others skilled in the art may appreciate and understand the principles and practices of this disclosure.

The flow heater illustrated in FIGS. 1 to 4 comprises a channel or passageway 1 leading from an inlet 5 to an outlet 6, a heating resistor 2, a swing mechanism 3 (also referred to as a "swing") arranged in the channel or passageway, a housing 4, a valve plate or flap 7, a limiting block 8, a magnet 9, a hall sensor 10, a bypass liquid path 11 and a rotating shaft 12.

Figure 2:
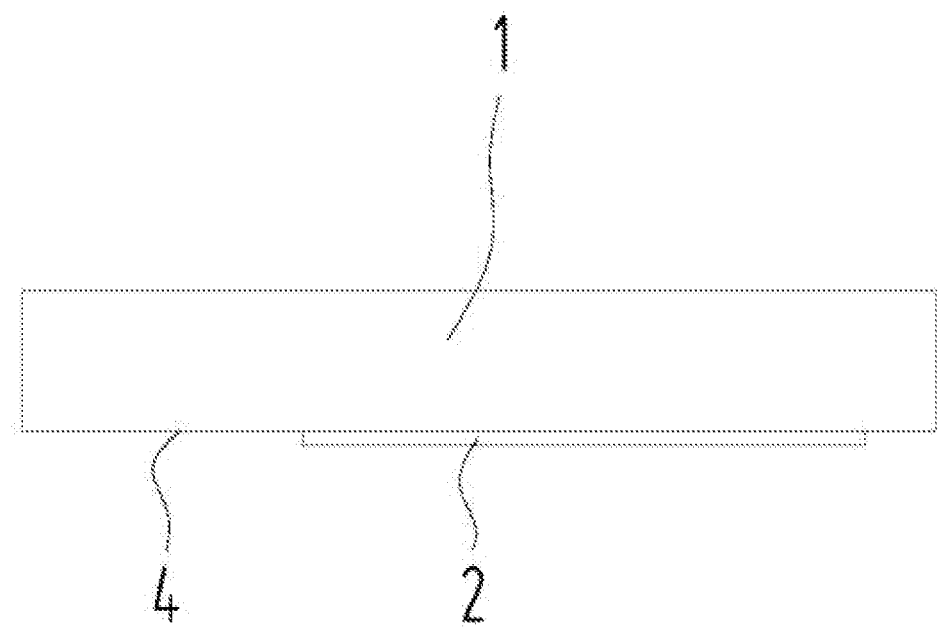
FIG. 2 is a schematic diagram of the position of the heating resistor in the heater.

The flow heater as shown schematically in FIG. 1 comprises a liquid channel 1, a heating source 2, e.g., a resistor, and a swing mechanism 3. Channel 1 is a sealed volume inside a housing 4 that has only two ports of channel 1, namely a cooling liquid inlet 5 and a cooling liquid outlet 6. The heating source 2 is arranged outside the channel 1. In this embodiment, the channel 1 is in the shape of a flat box, the heating source 2 is attached to a side surface of the box and covers most of the surface of the box. When the cooling liquid flowing in from the inlet 5 passes through channel 1, the heating source 2 generates heat that is transferred to the liquid. The liquid is discharged from outlet 6, as shown in FIG. 2. The heating source 2, e.g., an electrical resistor, may be attached to an outer wall of channel 1 by a screen printing or thermal spraying process, and the heating source 2 and the outer wall of the channel 1 are provided with insulating layers.

Figure 3:
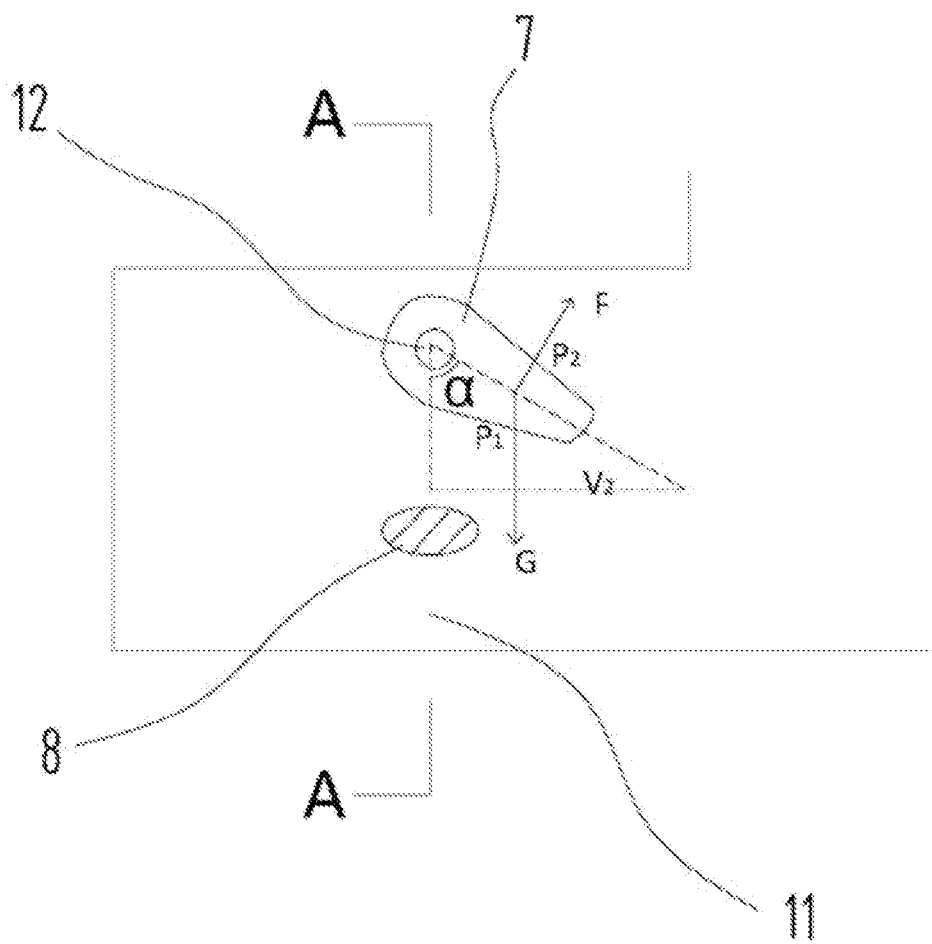
FIG. 3 is a schematic structural diagram of the swing mechanism of the heater.

The swing mechanism 3 is positioned in the channel 1 close to the inlet 5, as shown in FIG. 3. The swing mechanism 3 comprises a flap or valve plate 7 and a limiting block 8. The flap or valve plate 7 is rotatably fixed to the inner wall of the channel, e.g., close to the inlet 5. The limiting block 8 is fixed to the inner wall of the channel 1 and may be positioned below the flap or valve plate 7 thereby preventing the flap or valve plate 7 from turning to the outside of the inlet 5.

Figure 4:
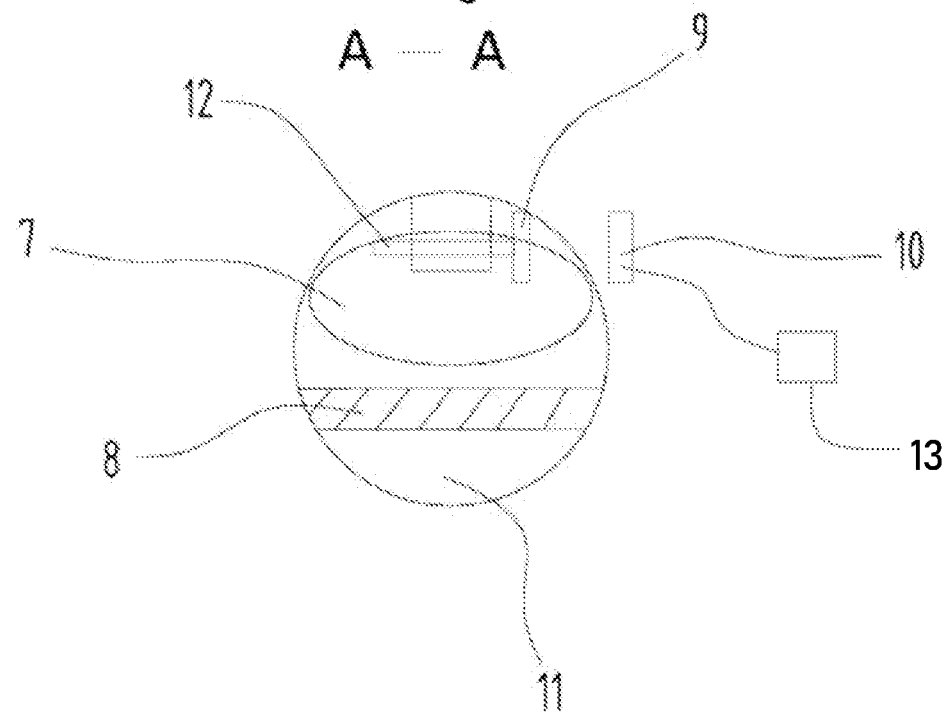
FIG. 4 is a sectional view taken along line A-A in FIG. 3.

As shown in FIG. 4, a magnet 9 is arranged on the flap valve plate 7 and a corresponding hall sensor 10 is arranged outside the channel 1. The hall sensor 10 is used as a non-contact angle sensor and is provided with a hall chip. The hall sensor 10 is used to detect the position of the flap or valve plate 7. If there is no flow, the flap or valve plate 7 is in its resting position where it abuts the limiting block 8. If there is a flow it pushes the flap against a restoring force, which may be provided by gravity or by a spring or similar elastic element, into a position as shown in FIG. 3, i.e., a position in which it offers less resistance to the flow. Thus, the position of the flap or valve plate 7 can be used to determine whether (sufficient) liquid is flowing through the channel 1.

As the hall sensor 10 needs no mechanical contact to the flap or valve plate 7, the position of the flap or valve plate 7 can be detected without friction or abrasion. In the embodiment shown, the hall sensor 10 cooperates with the magnet 9 on the valve plate 7, so that the measurement precision is high, the cost is low, and the installation is convenient. The hall chip detects the magnetic field change generated by the swing angle α of magnet 9, which may be a piece of magnetic steel.

The flap or valve plate 7 is smaller than the cross sectional area of the channel 1. Thus, there is a gap between the limiting block 8 and the inner wall of the channel 1 as shown in FIG. 3. Thereby a normally open bypass liquid path 11 is reserved between the swing mechanism 3 and the inner wall of the inlet 5. Cooling liquid entering from the inlet 5 passes through the bypass liquid path 11. By keeping channel 1 full of liquid, the heating source 2 is prevented from being burnt. In addition, in order to adapt to different practical conditions, the flow of the bypass liquid path 11 is adjusted according to the distance between the limiting block 8 of the swing mechanism 3 and the inner wall below the inlet 5. The lowest flow is usually kept, so that channel 1 is kept full of liquid. If the flap or valve plate 7 is blocked, e.g., by some fault or damage, the bypass liquid path 11 ensures flow of liquid from inlet 5 to outlet 6.

In the embodiment shown, inlet 5 and outlet 6 face the same side, or in the same direction, and inlet 5 has the same cross-sectional size as the opening, so that the flow of the cooling liquid is the same, which facilitates statistics and arrangement of data, facilitates the control system to process the flow data, and makes the volume of the whole heater smaller and the structure more compact.

The flap or valve plate 7 may have a circular or elliptical shape and is on the inner wall of the channel 1 or inlet 5 by means of a rotating shaft 12. The shaft 12 is fixedly supported on the inner wall of the channel 1 or inlet 5. The shaft 12 may be parallel to the length and/or the diameter of the flap or valve plate. The flap or valve plate 7 rotates along with the rotating shaft 12, the flap or valve plate 7 is arranged in such a way that the impact force of cooling liquid moves or rotates it into a position wherein a restoring force acting on the flap or valve plate 7 is equal to the impact force of the liquid flow.

If the cross section of the inlet 5 is square or round, the valve plate 7 may be round. If the cross section of the inlet 5 is rectangular or elliptical, the valve plate 7 may be elliptical so as to adapt to the shape of the channel 1 of the inlet 5, thereby facilitating the bypass liquid path 11.

The flap or valve plate 7 has a root part, by which it is connected to the rotating shaft 12. In the embodiment shown, the root part is at one end of the flap or valve plate and the thickness of the valve plate 7 is gradually reduced from the root part to the opposite end. The shaft 12 might also be arranged in the center of the flap or valve plate 7. The front surface and the rear surface of the flap or valve plate 7 are streamline surfaces, so that friction between the liquid and the flap or valve plate is reduced. Moreover, a streamline surface can also prevent liquid from sputtering. When liquid impacts a straight surface, certain reflection can be generated, the reflected liquid can influence the liquid going forward subsequently, the liquid generates a buffering phenomenon, and then the swing angle of the valve plate 7 is influenced.

In addition, the upper surface and the lower surface of the limiting block 8 may be both arc-shaped. When liquid impacts the limiting block 8, the liquid can flow away from the surface of the limiting block 8 quickly, and friction between the liquid and the surface of the limiting block 8 is reduced as much as possible.

In operation cooling liquid flows in from an inlet 5 and the flap or valve plate 7 is impacted by the liquid causing a swing angle inwards around a rotating shaft 12. A limiting block 8 right below the flap or valve plate 7 prevents the valve plate 7 from swinging in a reverse direction, so the swing angle between the flap or valve plate 7 and the direction of flow is usually 0-90 degrees. The cooling liquid respectively flows between the flap or valve plate 7 and the limiting block 8 and between the limiting block 8 and the inner wall of channel 1 or inlet 5. A magnet 9 fixed on the valve plate 7 enables a Hall sensor 10 to detects the swing angle and reports it to a control 13. Control 13 is also referred to herein as a control electronic and is schematically depicted in FIG. 4. The control learns the current liquid flow or flow speed from swing angle data. The control can therefore monitor liquid flow or flow speed by analyzing the swing angle of the flap or valve plate 7. A lack of liquid or flow can be recognized and in such a case heating power can be switched off to prevent overheating.

The control may comprise a circuit board, a routing wire and related protection accessories. The structure of the control may be a conventional control system structure.

The relationship between the swing angle of the flap or valve plate 7 and the flow speed may be described in terms of the effective flow area at the flap or valve plate $A_{Flow\text{-}eff}$, the radial cross-sectional area of the inlet $A_{Tube}$, the area of the flap or valve plate $A_{Flow\text{-}eff}$, the area of the projection of flap or valve plate on the radial section of the inlet $A_{Flap\text{-}eff}$, the swing angle of the flap or valve plate α (angle between the valve plate 7 and the radial section of the inlet 5), the inlet (heater product) volume flow Q, the liquid density p, the liquid thrust to the flap or valve plate F, the gravity or other restoring force acting on the flap or valve plate G, the pressure of liquid against flap or valve plate $P_1$, the liquid pressure $P_2$, the liquid flow rate at inlet $V_1$, the liquid flow rate at the flap or valve plate $V_2$, $$A_{Flow\text{-}eff} = A_{Tube} - A_{Flap\text{-}eff}$$

$$A_{Flap\text{-}eff} = A_{Flap} \cdot \cos \alpha \quad (1)$$

in addition, liquid flow rate at the inlet: $V1 = Q/A_{Tube}$
Flow rate of liquid at flap or valve plate:

$$V2 = Q/(A_{Tube} - A_{Flap\text{-}eff}) = Q/(A_{Tube} - A_{Flap} \cdot \cos \cdot) \quad (2)$$

According to Bernoulli's equation $V_1^2/2 + P_1/\rho = V2^2/2 + P_2/\rho$
Available $P_1 - P_2 = \rho(V_2^2 - V_1^2)/2$
Equations (1) and (2) can give:

$$P_1 - P_2 = \rho[1/(A_{Tube} - A_{Flap} \cdot \cos \alpha)^2 - 1/(A_{Tube})^2]/2 \cdot Q^2 \quad (3)$$

Thrust of liquid against flap or valve sheet:

$$f = (P_1 - P_2) \cdot A_{Flap}$$

Can be brought into the formula (3)

$$F = \rho \cdot A_{Flap} \cdot [1/(A_{Tube} - A_{Flap} \cdot \cos \alpha)^2 - 1/(A_{Tube})^2]/2 \cdot Q^2 \quad (4)$$

According to Newton's first law of motion, $F = G \sin \alpha$
With equation (4) can be obtained:

$$F = G \cdot \sin \alpha = \rho \cdot A_{Flap}[1/(A_{Tube} - A_{Flap} \cdot \cos \alpha)^2 - 1(A_{Tube})^2]/2 \cdot Q^2 \quad (5)$$

In equation (5), all quantities are known, except α and Q. By measuring the swing angle α, the flow Q of the cooling liquid can therefore be calculated. Considering that the calculation by using the formula (5) in engineering application is complicated, the corresponding relation between α and Q can be calculated in advance by software such as Matalab and the like, the corresponding relation is stored in a controller, a table look-up method is used to obtain the value of the flow Q in practice, and the value can be calibrated and corrected by a test system to obtain better precision.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A flow heater for an automobile, comprising:
   a passageway provided inside a housing and connecting an inlet and an outlet;
   a swing mechanism arranged inside the passageway;
   a heating source located on an outside of the passageway and configured to heat liquid inside the passageway;
   said swing mechanism comprising a flap and a stopper, wherein the flap is hinged to an inner wall and the stopper is fixed within the passageway and located to abut the flap in the absence of flow, wherein the stopper divides the passageway into a first liquid path in which the flap is located and a bypass liquid path which remains open when the flap abuts the stopper;
   said flap comprising a magnet; and
   a Hall sensor arranged outside of the passageway configured to detect the position of the flap.

2. The flow heater according to claim 1, wherein the inlet and the outlet face towards the same side of the housing.

3. The flow heater according to claim 1, wherein the stopper has a pair of arc-shaped surfaces located on opposite sides of the stopper whereby friction between the liquid and the stopper is reduced.

4. The flow heater according to claim 1, wherein the flap is made of stainless steel or aluminum.

5. The flow heater according to claim 1, wherein the flap has a circular or oval shape when the flap is viewed in a direction which maximizes the projected area of the flap and the flap is attached to the inner wall of the passageway via a rotating shaft.

6. The flow heater according to claim 5, wherein the flap has an oval shape and the rotating shaft is parallel to the long axis of the oval.

7. The flow heater according to claim 5, wherein the rotating shaft is inserted into a root part of the flap, wherein the thickness of the flap is gradually reduced with increasing distance from the root part, and the front surface and the rear surface of the flap are streamline surfaces.

8. The flow heater according to claim 1, wherein the upper surface and the lower surface of the stopper are both arc-shaped.

9. A flow heater, comprising:
   a housing having an inlet and an outlet,
   a passage for liquid to be heated, said passage connecting the inlet and the outlet,
   a heat source for heating liquid in the passage,
   a flap arranged inside the passage wherein the area of the flap is smaller than the cross section of the passage whereby there is in every position of the flap a bypass path between the flap and an inner wall of the passage,
   a stopper fixed within and dividing the passage, the stopper being located to abut the flap in the absence of flow and during minimal flow when no flow is impinging on the flap and the flow within the passage at the flap is confined to the bypass path,
   a Hall sensor for detecting a swing angle of the flap; and
   a control electronic coupled with the Hall sensor, the control electronic being configured to determine a flow rate of the liquid as a function of the swing angle.

10. The flow heater according to claim 9, wherein the flap carries a magnet and the sensor is a Hall sensor is arranged outside of the passage.

11. The flow heater according to claim 9, wherein the heat source is an electrical resistor.

12. The flow heater according to claim 9, wherein said control electronic is configured to turn the heat source off when a position of the flap is detected that indicates that no flow is impinging on the flap.

* * * * *

UNITED STATES PATENT AND TRADEMARK OFFICE
CERTIFICATE OF CORRECTION

PATENT NO. : 11,709,001 B2
APPLICATION NO. : 17/012950
DATED : July 25, 2023
INVENTOR(S) : Zhang et al.

It is certified that error appears in the above-identified patent and that said Letters Patent is hereby corrected as shown below:

In the Claims

Column 6, Line 57, Claim 10, the phrase "and the sensor is a Hall sensor" should read --and the Hall sensor--.

Signed and Sealed this
Fifth Day of September, 2023

Katherine Kelly Vidal
*Director of the United States Patent and Trademark Office*